No. 667,973. Patented Feb. 12, 1901.
A. J. CROSS.
OPTOMETER.
(Application filed June 16, 1899.)
(No Model.) 2 Sheets—Sheet 1.
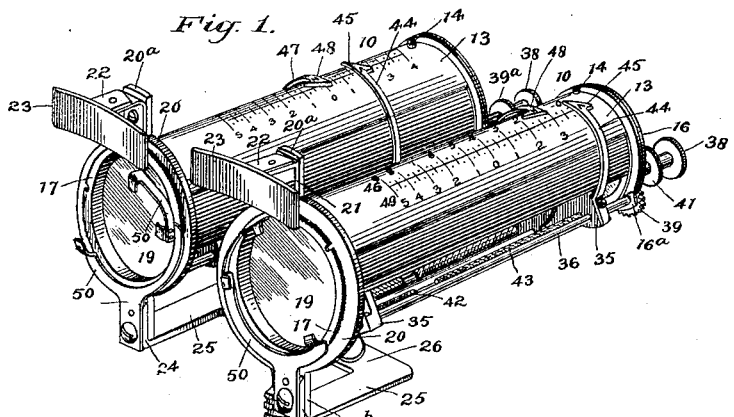
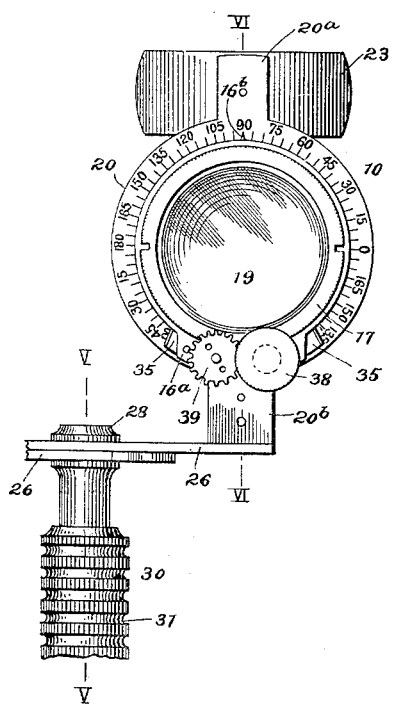
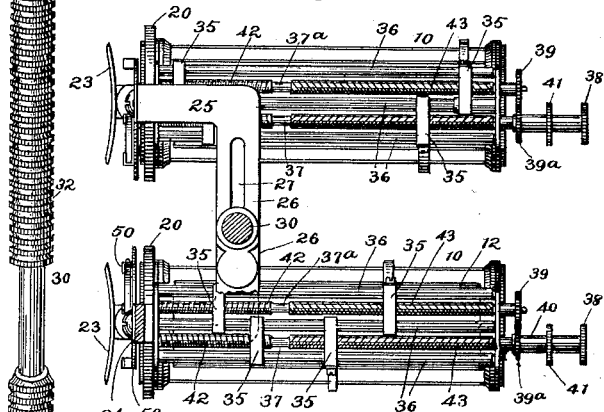
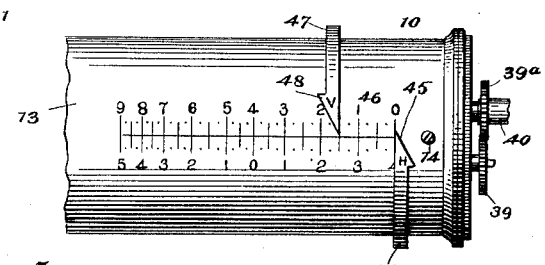
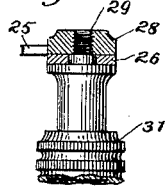
WITNESSES:
C. S. Cowley
G. J. Carey
INVENTOR
Andrew J. Cross,
BY
Hutchinson & Criswell
ATTORNEYS No. 667,973. Patented Feb. 12, 1901.
A. J. CROSS.
OPTOMETER.
(Application filed June 16, 1899.)
(No Model.) 2 Sheets—Sheet 2.
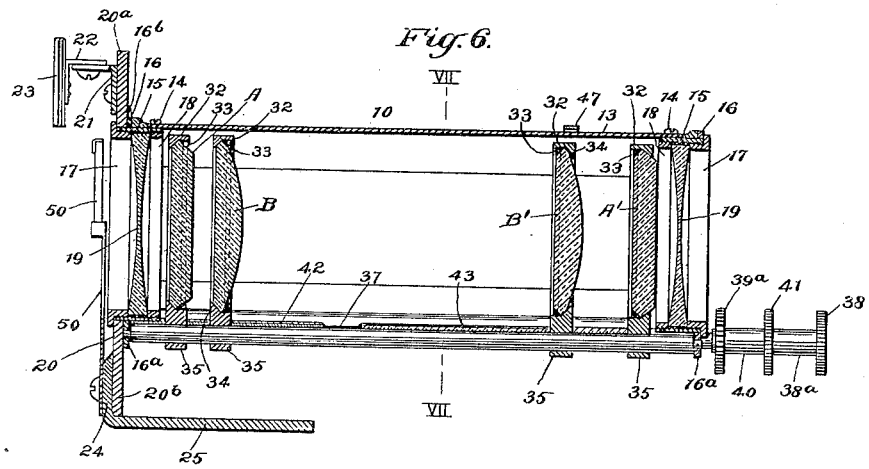
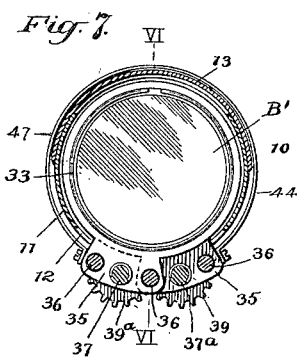
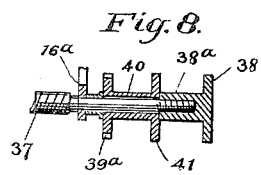
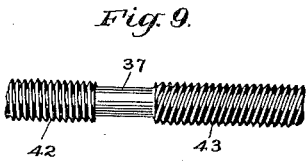
WITNESSES:
C. S. Cowley.
G. J. Carey.
INVENTOR
Andrew J. Cross,
BY
Hutchinson & Criswell
ATTORNEYS

UNITED STATES PATENT OFFICE.

ANDREW JAY CROSS, OF NEW YORK, N. Y.

OPTOMETER.

SPECIFICATION forming part of Letters Patent No. 667,973, dated February 12, 1901.

Application filed June 16, 1899. Serial No. 720,764. (No model.)

*To all whom it may concern:*

Be it known that I, ANDREW JAY CROSS, of the city, county, and State of New York, have invented certain new and useful Improvements in Optometers, of which the following is a full, clear, and exact description.

My invention relates to improvements in that class of instruments which are used in detecting errors of various kinds in the eyes of patients with a view of correcting the sight by proper glasses; and one object of my invention is to provide an instrument that will aid materially in the subjective estimation or measurement of errors in ocular refraction both in a monocular and binocular manner. It is well known that the present method of measuring eyes subjectively for the purpose of determining this refractive condition is accomplished by means of loose lenses placed before an eye in what are called "trial-frames;" also by stationary instruments usually based on the Galileo form of telescope, that measure only one eye at a time and which frequently either increase or decrease the apparent size or distort the shape of objects viewed through them in a manner differing from the action of a single lens of equal refractive value.

My invention is intended to overcome the uncertainties and inaccuracies common to the above-mentioned methods. It is also intended to give a hand device which is at once easy of manipulation, quick and reliable in its work, and general in its application to the needs of eye-examiners in the measurement of errors of ocular refraction.

Another object of my invention is to make a device in such a way that it can be conveniently held by the patient without fatigue, and also to make it mechanically simple and exact and at the same time easy of manipulation and little liable to get out of order or to have the proper relation of its lenses disturbed.

With these ends in view my invention consists of certain features of construction and combinations of parts, which will be hereinafter fully described and claimed.

In the drawings, wherein similar characters of reference designate similar parts, Figure 1 is a perspective view of the complete device ready for use. Fig. 2 is an inverted plan view with parts broken away and with the handle in section. Fig. 3 is a broken enlarged rear end view of one of the sight-tubes. Fig. 4 is a broken plan view of one of the sight-tubes, showing especially the graduated table on which the combined refractive value of the lens system is indicated. Fig. 5 is a detail sectional view partly on the line V V of Fig. 3. Fig. 6 is a longitudinal section on the line VI VI of Figs. 3 and 7. Fig. 7 is a cross-section on the line VII VII of Fig. 6 looking toward the rear end of the sight-tube. Fig. 8 is a detail sectional view showing means of working the lens-screws; and Fig. 9 is a detail of one of the lens-operating screws, showing the opposite pitch of the screws.

In carrying out the invention I prefer to make the instrument binocular, as shown in Fig. 1, in which case two similar sight-tubes 10 are arranged parallel with each other and supported as described below; but it will be clearly understood that one of these tubes may be made, if desired, and that the invention is equally applicable to one or two.

My invention consists, broadly, in the arrangement of the lenses A A' and B B', so that they may be adjusted in relation to each other, each pair of lenses being of cylindrical curvature and having their meridional axes at right angles to each other. It is necessary, however, to have means of adjusting these lenses in relation to each other, also to have means of turning them on their optical axis, and the drawings show an apparatus which is especially designed to accomplish this result in the easiest manner; but I wish it distinctly understood that my invention is not limited to the precise mechanism shown for manipulating the lenses.

Each tube 10 comprises a cylindrical body portion 11, which is open at the bottom, as shown at 12, so that the extensions of the lens-rings may pass through, as described presently, and the body is similarly open at the top, which top opening is concealed by the removable cover 13, the latter being held in place by screws 14 or other means of fastening. The object of having this removable cover is to enable the lenses to be reached with a suitable instrument in order that they may be cleaned and adjusted when necessary, and this is essential, as the adjustment of the lenses is one of the utmost nicety.

The screws 14 fasten the cover ends to the internally-screw-threaded collars 15, which project slightly beyond the ends of the cover, which ends are thickened, as shown. The collars 15 are in reality integral with and a part of the body 11 and carry the rings 16, which encircle the collars and have depending lower portions forming hangers 16$^a$, in which the guide-rods and lens-screws are hung, as hereinafter described. The rings 16 are held in place by the flanged cylindrical nuts 17, which screw into the ends of the collars 15, and the nuts 17 also bind in place fixed lenses 19 at the tube ends, these lenses being held between the nuts and the rings 18, which are screwed into the inner ends of the collars 15. The lenses 19 are spherical lenses of the usual kind, being as here arranged of negative value.

At the front end each tube 10 is journaled in a wide ring 20, the outside of the front collar 15 being the part bearing upon the ring, and the ring 20 is of such width that its back side serves as a table, (see Fig. 3,) on which is marked off a graduated arc to indicate in degrees the position of any meridional errors of vision, this being indicated by the pointer 16$^b$, formed on the front ring 16, and as the latter turns with the tube 10, while the ring 20 is stationary, it will be seen that the indications must be accurate.

Each ring 20 has an extension 20$^a$ at the top, to the front of which is fixed the small angle-bracket 21, and on the projecting portion of the bracket is pivoted a second angle-bracket 22, to which is attached the usual headpiece 23, adapted to rest against the brow of the patient. These headpieces are self-adjusting, and their arrangement is claimed as novel. Each ring 20 has also at the lower end an arm or support 20$^b$, which is securely fastened to the upright portion 24 of the bent arm 25, which is adapted to lie in a horizontal plane, one part of the arm extending backward parallel with the tube 10 and the other part 26 extending inward at right angles to the tube. The inner portion 26 of the lower arm is slotted longitudinally, as shown at 27, and the arms are adapted to overlap, as best shown in Fig. 3, while the top arm carries a fixed nut 28, adapted to receive the reduced and screw-threaded end 29 of the handle 30, which handle may of course be of any approved form, but which, as shown, has the enlarged milled or roughened portions 31 to make it convenient to grasp. It will be seen that by having supporting-arms 25 and 26 extending rearward, as shown, it balances the instrument to such an extent that it may be held easily by the patient while his eyes are being examined, and also that the slotted portion of the supporting-arms make the tubes adjustable in relation to each other, so that they may be readily adapted to eyes of different patients which may vary in their distances apart.

The movable lenses A A' and B B' are each hung or carried in a ring 32, which slides longitudinally in the tube 10, and the lenses can be fastened in any convenient way, but, as illustrated, are held by the split rings 33, which bind the lens edges against the abutment 34 of the rings.

Each ring 32 has a depending portion or extension 35, which projects downward through the opening 12 of the tube 11, and the extensions 35 of the several rings are preferably staggered, as shown in Fig. 7, to permit them to be more readily adjusted to their guide-rods 36 and working screws 37 and 37$^a$. It will be understood, however, that the meridional axes of the pairs of lenses should be at right angles to each other.

The several ring extensions slide on the guide-rods 36, which extend longitudinally beneath each tube 10, being held in hangers 16$^a$, and the lenses are worked backward and forward by the screws 37 and 37$^a$, which are threaded into the extension of the rings and which are journaled into the hangers 16$^a$, the lenses B and B' being directly connected with the screw 37 and the lenses A and A' with the screw 37$^a$. The screw 37 has at its rear end, which projects sufficiently beyond the tube 10, a milled wheel 38 or other means of turning it. The screw 37$^a$ has a gear-wheel 39 thereon, which meshes with a similar gear 39$^a$ on the sleeve 40, which latter is journaled on the projecting end of the screw 37, and the sleeve 40 has a milled wheel 41 or equivalent means of turning it, which wheel abuts with the hub 38$^a$ of the milled wheel 38. It will be seen then that by turning the milled wheel 38 the screw 37 will be turned and the lenses B and B' moved longitudinally in the tube 10, while by turning the milled wheel 41 the movement is transmitted through the gears to the screw 37$^a$ and the lenses A A'. It is necessary, however, in some cases that the lenses of each pair be moved in opposite directions to each other, and it is also necessary sometimes to move all four of the lenses simultaneously and in close connection, for reasons presently specified, and it is further necessary that one lens of each pair be moved in relation to the other lens in a ratio of two to one in order to preserve the right effect, as hereinafter described, and to these ends the means above described for moving both screws in unison are necessary, and the screws are also given at opposite ends opposite pitch, as shown best in Fig. 9. The forward part 42 of each screw therefore is pitched in one direction, while the rear end 43 is given twice as steep a pitch in the opposite direction. Consequently when the screws are turned the lenses A A' or B B' will be oppositely moved and the lenses A' B' will move twice as fast as the lenses A B. If the lenses B B' are to be moved while the position of the lenses A A' remains stationary, the wheel 38 and screw 37 are moved, thus actuating the lenses B B', and if the lenses A A' are to be moved and the lenses B B' remain stationary the milled wheel 41 is turned, thus actuating the screw 37ª and moving the desired lenses which are attached to said screws. The above movements will be for cylindrical effects only, and if spherical effects are to be obtained the lenses A and B are moved up in close contact, the lenses A' and B' also moved into close contact, and then the two wheels 38 and 41 are simultaneously turned and the two pairs of lenses will be moved in unison, the relative positions of the lenses A and B will not be changed, and the relative positions of the lenses A' and B' will also remain constant. It is known that if two cylindrical lenses have their meridional axes at right angles a spherical effect is produced, and so when the lenses are combined as last described and moved as specified it will be for spherical effect, while by moving the pairs of lenses separately and in different ratios, as may be necessary, cylindrical effects are obtained. It follows, then, that for spherocylindrical effects it is only necessary to combine these two movements. This will be more largely explained after fully describing the structure of the apparatus.

From the foregoing description it will be seen that the lenses may be adjusted so as to correct the eyesight of the patient and enable him to see clearly; but indicators must be had so that the degrees of correction or of error may be noted. For meridional effects the tube is turned in the direction that the patient says he sees best, and the position to which it is turned is the axis of error, which is indicated by the pointer 16ᵇ on the graduated table of the ring 20, and in order that the amount of meridional errors of curvature may be indicated the lens-ring 32 of the lens A' is provided with a curved arm 44, which is attached to the extension 35 of the ring (see Fig. 1) and extends upward around the exterior of the tube 10, terminating in a pointer 45, which moves over the graduated table 46, and so indicates the amount of the error of curvature in the meridian for which the tube is adjusted, while the ring 32 of the lens B' is provided with a similar arm 47, which likewise curves upward around the opposite side of the tube 10, but terminates in a pointer 48, moving over the same table 46, and indicates error in the curvature whose axis is at right angles to the above-mentioned meridian, for which the tube is adjusted.

It is of course evident that the tables may be made, if preferred, to accommodate the movements of the lenses A and B, and that the indicating-pointers may be connected with the rings of said lenses, as well as with the lenses A' B'.

At the front of each tube is the usual spring-clip 50, common to various optical instruments and which it is not necessary to describe, this ring being for the purpose of holding loose or auxiliary lenses, which may be placed temporarily therein in certain cases.

As illustrated in the drawings, the lenses A and A' are cylindrical lenses having horizontal meridional axes, and the lenses B B' are cylindrical lenses having vertical meridional axes. If then the errors of vision relate wholly to divergence of vertical or horizontal curvature from the normal, this error of vision can be detected by adjusting the position of the several movable lenses in relation to each other. Attention is here called to the fact, which I have discovered in experimenting with the apparatus, that in order to have the entering and emerging pencil of light occupy the same area on the two lenses 19 opposed pairs of movable lenses, if of equal strength, should be made to move in relation to each other in the given proportion of two to one. I have also discovered that this result can be obtained by using several combinations of lenses and ratios of movement. The broken lines in Fig. 6 show the course of the light pencil and how the refractive effect of the several lenses makes the light pencil of the same area or diameter on the two outside lenses 19 of the instrument. When the lenses A A' or B B' are moved back and forth, as already described, the angle of the light pencil will of course change at points between the two lenses 19; but their ratio of movement is such as to make the size of the pencil constant on these lenses. If the same area of the light pencil on the outside lenses were not maintained, there would be an apparent variation of size and definition, which would have to be overcome for dioptrometrical purposes; but by preserving this equality of area on the said lenses an eye placed at the point of emergence will receive rays from an object, which will cause it to appear of the same size as if viewed through a single lens of like power. I therefore do not confine my invention to any specific combination of lenses or any particular movements of the same—as, for instance, the effect might be had by dispensing with the end lenses and using instead a plus lens in the center of the tube between the opposed pairs and changing the character of the cylinders to negative lenses. Also it will be seen that if the opposed lenses, which are described as moving in the ratio of two to one, have their values changed, so that the lens A' is twice as strong as the lens A and the lens B' twice as strong as the lens B, then the effect described will obtain if the opposed lenses are given an equal movement or an equal speed. From this it will be seen that without illustrating all possible combinations several combinations of lenses might be produced which would have the optical effect which has been herein described and illustrated. It will also be noticed that the specific number of lenses may be changed, and I wish to make it clear that my invention covers the system described of producing what is practically a mobile lens, giving by the different composition of its parts any desired refractive effect. It must be borne in mind, however, that no matter what the combination of lenses used the entering and emerging pencil of light of the instrument must occupy the same lens area.

To discover errors of spherical curvature, the lenses A and B and A' and B' are placed in close contact and then adjusted back and forth until the patient can see clearly, while if the errors relate to ellipsoidal curvature of the eye this can be detected by turning the entire tube and then adjusting the lenses longitudinally therein to the right extent, and then the distance which the tube is turned will be indicated on the table of the ring 20.

It will of course be understood that the patient places the instrument to his eyes and that the examiner then moves the several lenses until the patient can see clearly, and when this—the point at which the vision is best—is attained the departure from normal will be indicated on the two tables referred to above, and the lenses can be ground as indicated by the tables and will be the correct ones for the patient to wear.

From the foregoing description it will be seen that the means of combining and operating lenses are such that each pair of correlated cylindrical lenses can be moved with or independent of the other, that the whole series can be revolved on the optical axis of the lenses, and that thereby it is possible to obtain any strength of cylindrical or spherical lens-power, either simple or compound, and at any desired axis.

For measuring certain cases it is necessary to have binocular testing mechanism, and the invention meets these requirements.

Having thus described my invention, I claim as new and desire to secure by Letters Patent—

1. In an apparatus of the kind described, the combination of a series of cylindrical lenses having crossing meridional axes, said lenses being movable in relation to each other, and mechanism for differentially moving the said lenses so that the entering and emerging pencil of light has essentially the same area on the outside lenses.

2. An apparatus of the kind described comprising a series of lenses arranged on a common optical axis, said lenses being movable in respect to each other along said axis, and a screw mechanism for effecting such movement, said mechanism being arranged and speeded so that a light pencil passing through the series of lenses has a constant and equal area on the outside lenses.

3. The combination with a pair of spherical lenses, of a series of cylindrical lenses arranged between the spherical lenses, the cylindrical lenses having crossing meridional axes and all the lenses having a common optical axis, and mechanism for simultaneously moving the cylindrical lenses along the optical axis but at different speeds so that a pencil of light passing through the whole series of lenses will have a constant and equal area on the two outside lenses.

4. In an apparatus of the kind described, the combination of a series of cylindrical lenses arranged in pairs with crossing meridional axes, said lenses being movable back and forth along their optical axes, and means for rotating the lenses on their common optical axis.

5. An apparatus of the kind described comprising a tube having outside spherical lenses, a series of cylindrical lenses arranged between the spherical lenses with the axes of the cylindrical lenses crossing, and means for both independently and simultaneously moving the cylindrical lenses with reference to the outside lenses and to each other, substantially as described.

6. In an apparatus of the kind described, the combination with a rotary tube of lenses in the ends thereof at fixed distances apart, and movable lenses between the fixed lenses, the movable lenses being cylindrical lenses with their meridional axes at right angles to each other, substantially as described.

7. In an apparatus of the kind described, the combination of a support, a tube rotatably mounted in the support, stationary lenses in the tube ends, and longitudinally-movable cylindrical lenses within the tube, the movable lenses having their meridional axes crossing, substantially as described.

8. An apparatus of the kind described comprising a rotatable supported tube having stationary end lenses, adjustable cylindrical lenses within the tube, the cylindrical lenses having crossing meridional axes, and an indicator operated by turning the tube to show the departure from the normal position, substantially as described.

9. In an apparatus of the kind described, the combination with the cylindrical lenses having crossing meridional axes, said lenses being movable in relation to each other along their optical axis, of an indicator operated by the movement of the lenses to indicate their relative position, substantially as described.

10. In an apparatus of the kind described, the combination with the supporting-tube and the cylindrical lenses having crossing meridional axes movable in relation to each other within the tube, of an exterior table on the tube, and an indicator moving in unison with the lenses and extending adjacent to the table, substantially as described.

11. In an apparatus of the kind described, the combination with the supporting-tube and the pairs of lenses having crossing meridional axes, the lenses being movable in relation to each other in the tube, of a double table on the tube indicating vertical and horizontal curvature, and indicators movable in connection with the opposite lenses, said indicators extending adjacent to the appropriate table, substantially as described.

12. In an apparatus of the kind described, the combination with the tube rotatably mounted in its support, of a stationary table arranged in an arc near the tube end, an indicator carried by the tube and moving over the table, a second double table on the tube to indicate vertical and horizontal curvature, the cylindrical lenses movable back and forth within the tube, said lenses having crossing meridional axes, and indicators carried by the oppositely-formed lenses and moving over the tables on the tube, substantially as described.

13. An apparatus of the kind described comprising a tube having end lenses, a series of cylindrical lenses slidably mounted in the tube and having crossing meridional axes, and rotatable screws mounted on the tube and connected with the movable lenses, substantially as described.

14. In an apparatus of the kind described, the combination with the tube, of the movable lenses therein, the screws mounted on the tube and having parts of opposite pitch and different degrees of pitch thereon, and operative connections between the screws and lenses, substantially as described.

15. In an apparatus of the kind described, the combination with the tube having end lenses and the series of cylindrical lenses within the tube, said lenses having crossing meridional axes, of a pair of screws journaled on the tube, each screw having threads of opposite pitch connected with a pair of lenses to move the same, and a connection between the two screws whereby the same may be moved, together or separately, substantially as described.

16. In an apparatus of the kind described, the combination with the tube of the pair of lenses longitudinally movable therein and the pair of screws journaled on the tube and each connected with a pair of lenses to move them, of means for turning one of the screws, and a sleeve journaled on the first screw and geared to the second screw, substantially as described.

17. In an apparatus of the kind described, the combination with the tube and the lenses movable therein, of the lens-rings supporting the lenses and having radial extensions, guide-rods projecting through the extensions and supported on the tube, and a screw mechanism for moving the lenses longitudinally, substantially as described.

18. In an apparatus of the kind described, the combination with the movable lenses of a tube inclosing the same, said tube having end lenses, and a longitudinal opening with a detachable cover for the said opening, substantially as described.

19. In an apparatus of the kind described, the combination with the movable lenses, of the tube inclosing the same, said tube comprising a body portion carrying end lenses, the body portion having longitudinal openings therein, one of said openings serving to permit an operative connection with the lenses and move them, and the other being provided with a detachable cover, substantially as described.

20. In an apparatus of the kind described, the combination of the sight-tubes, the arms connected to the tubes to support them, said arms having crossing slotted portions one of which carries a nut, and a handle having a screw-threaded end adapted to extend through the slot of one arm and engage the nut of the other, substantially as described.

21. In an apparatus of the kind described, the combination with the sight-tubes, of the rings in which the sight-tubes are rotatably supported, the arms rigidly connected to the rings and laterally adjustable, and the handle having its end detachably secured to the arms and fastening the arms together, substantially as described.

22. The combination with the sight-tubes of a pair of headpieces pivoted at the upper ends and front sides of the tubes to turn laterally to adjust themselves to the brow, substantially as described.

23. An apparatus of the kind described comprising a sight-tube, a pair of stationary lenses mounted therein, a pair of movable lenses also held in the tube, longitudinally-movable slide-blocks carrying the last-mentioned lenses, and guides for the slide-blocks, substantially as described.

ANDREW JAY CROSS.

Witnesses:
WARREN B. HUTCHINSON,
C. S. COWLEY.